(12) United States Patent
Kasper et al.

(10) Patent No.: US 7,243,371 B1
(45) Date of Patent: **\*Jul. 10, 2007**

(54) METHOD AND SYSTEM FOR CONFIGURABLE NETWORK INTRUSION DETECTION

(75) Inventors: James W. Kasper, Austin, TX (US); Paul A. Beriswill, Cedar Park, TX (US); Kevin L. Wiley, Elgin, TX (US)

(73) Assignee: Cisco Technology, Inc., San Jose, CA (US)

( * ) Notice: Subject to any disclaimer, the term of this patent is extended or adjusted under 35 U.S.C. 154(b) by 968 days.

This patent is subject to a terminal disclaimer.

(21) Appl. No.: 10/011,817

(22) Filed: Nov. 12, 2001

Related U.S. Application Data

(63) Continuation of application No. 09/990,860, filed on Nov. 9, 2001.

(51) Int. Cl.
*G06F 11/00* (2006.01)
*G06F 11/30* (2006.01)
(52) U.S. Cl. .................. 726/22; 713/188
(58) Field of Classification Search .............. 713/200, 713/201, 188; 709/203, 224; 726/22
See application file for complete search history.

(56) References Cited

U.S. PATENT DOCUMENTS

| | | | |
|---|---|---|---|
| 5,557,742 A * | 9/1996 | Smaha et al. ............ 713/200 |
| RE36,417 E * | 11/1999 | Perelson et al. ........... 714/38 |
| 6,088,804 A * | 7/2000 | Hill et al. .................. 726/25 |
| 6,275,942 B1 * | 8/2001 | Bernhard et al. .......... 713/201 |
| 6,279,113 B1 * | 8/2001 | Vaidya ...................... 726/23 |
| 6,321,338 B1 * | 11/2001 | Porras et al. .............. 713/201 |
| 6,681,331 B1 * | 1/2004 | Munson et al. ............ 713/201 |
| 6,725,377 B1 * | 4/2004 | Kouznetsov ............... 713/201 |
| 2002/0032871 A1 * | 3/2002 | Malan et al. .............. 713/201 |
| 2002/0038339 A1 * | 3/2002 | Xu ............................ 709/203 |
| 2002/0073337 A1 * | 6/2002 | Ioele et al. ................ 713/201 |
| 2002/0156886 A1 * | 10/2002 | Krieski et al. ............ 709/224 |
| 2002/0157020 A1 * | 10/2002 | Royer ....................... 713/201 |
| 2002/0178374 A1 * | 11/2002 | Swimmer et al. ......... 713/200 |

OTHER PUBLICATIONS

U.S. Patent Application entitled *Method and System for Configurable Network Intrusion Detection* U.S. Appl. No. 09,990,860, filed Nov. 9, 2001. Inventors: Kasper, et al.

\* cited by examiner

*Primary Examiner*—Matthew Smithers
*Assistant Examiner*—Ali Abyaneh
(74) *Attorney, Agent, or Firm*—Baker Botts L.L.P.

(57) ABSTRACT

According to one embodiment of the invention, a method for automatically generating software code operable to detect a defined signature in network traffic comprises providing an inspector shell, generating a plurality of parameter name-value associations from provided configuration data, and automatically generating, by computer, an instance of the inspector shell having a signature defined by the parameter name-value associations.

19 Claims, 5 Drawing Sheets

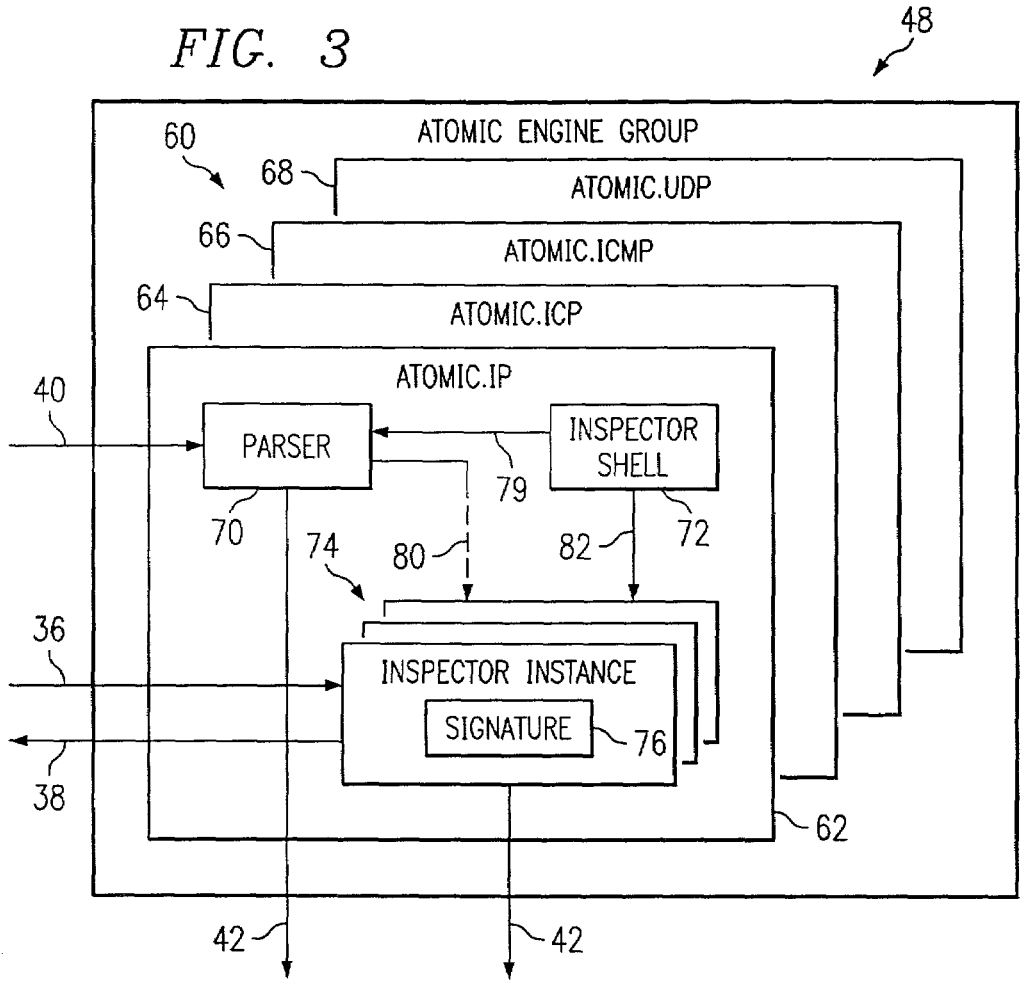
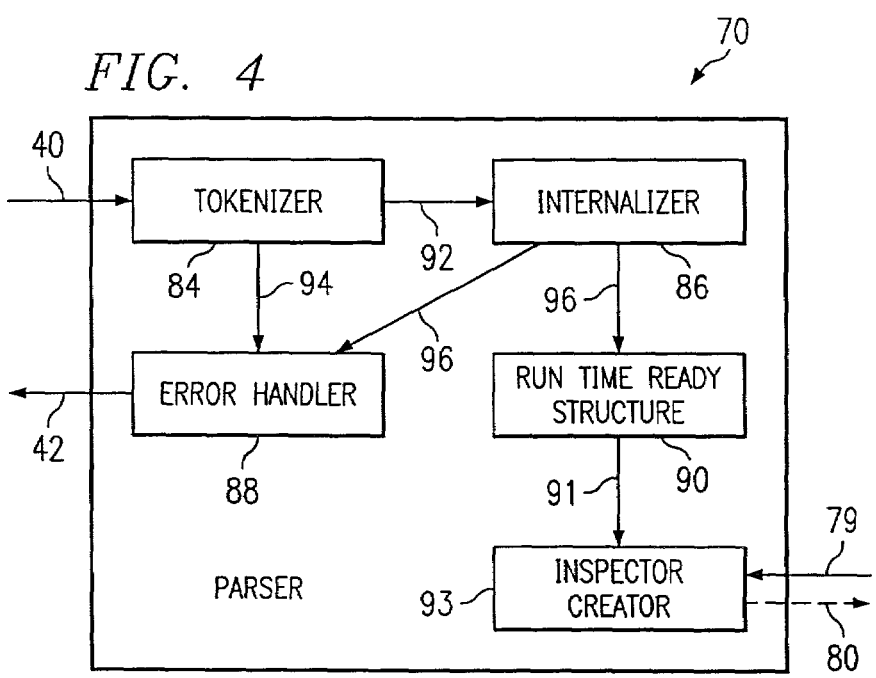

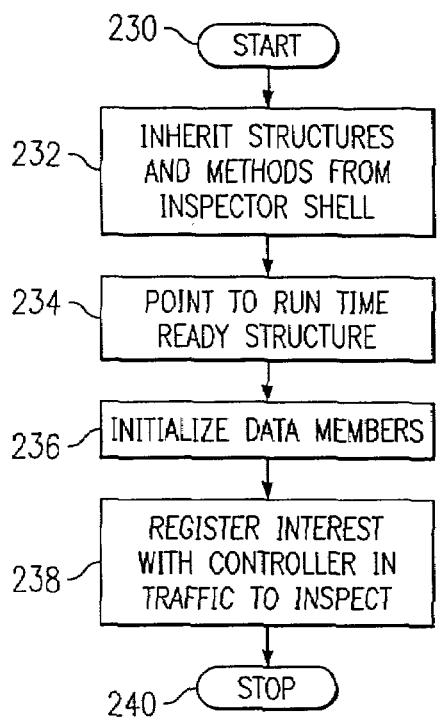
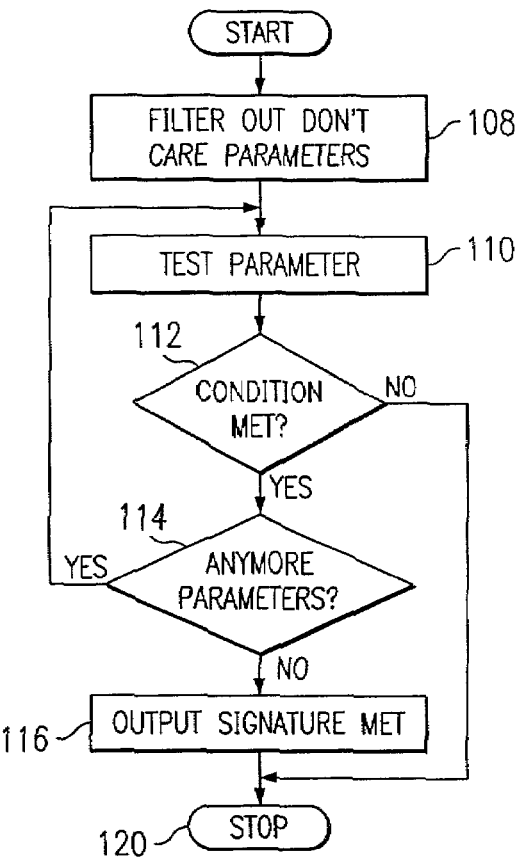
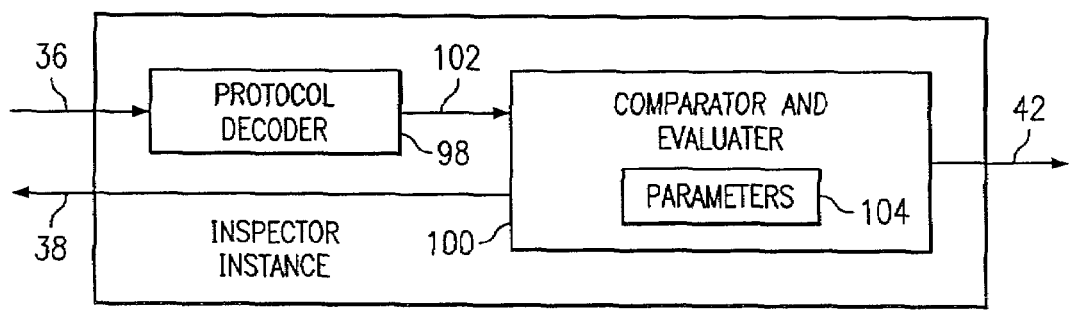

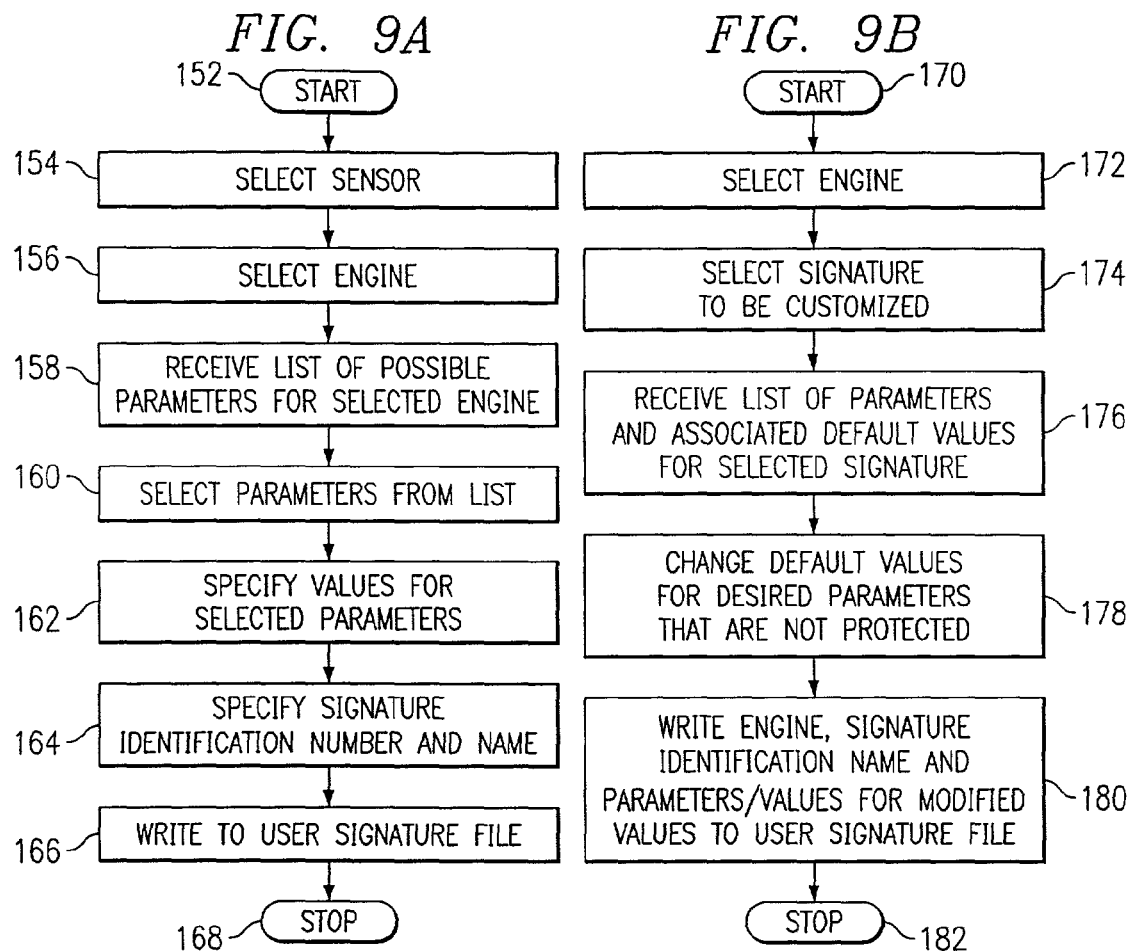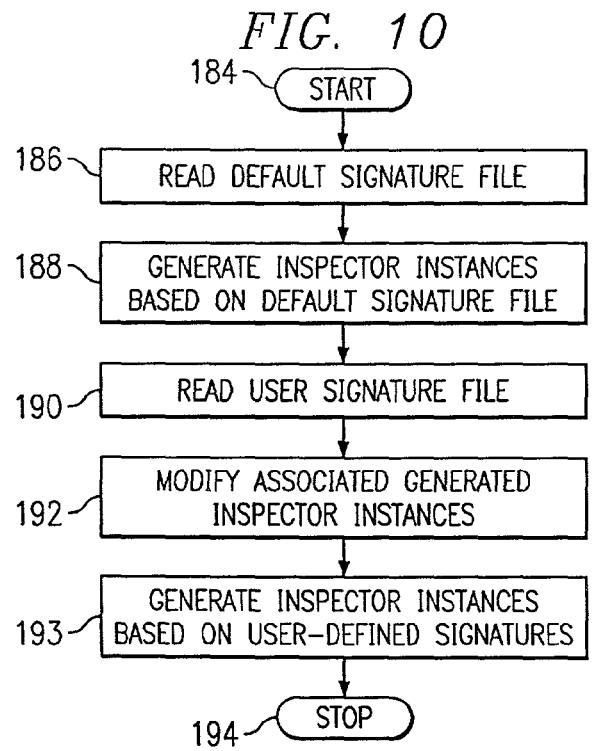

METHOD AND SYSTEM FOR CONFIGURABLE NETWORK INTRUSION DETECTION

CROSS-REFERENCE TO RELATED APPLICATIONS

This application is a continuing application under 35 U.S.C. § 120 of U.S. Ser. No. 09/990,860, having a filing date of Nov. 9, 2001, a title of Method and System for Configurable Network Intrusion Detection, and listing James W. Kasper, Paul A. Beriswill and Kevin L. Wiley as inventors.

TECHNICAL FIELD OF THE INVENTION

This invention relates generally to intrusion detection and more particularly to a method and system for configurable network intrusions detection.

BACKGROUND OF THE INVENTION

Telecommunications is becoming increasingly important in today's society. Both voice and data networks are pervasive and are relied upon in many aspects of one's day-to-day life. For example, local area networks within a company are widely used and the use of the Internet, one example of a wide-area network, has become commonplace. With the pervasive use of networks, the possibility exists for nefarious attacks on the networks. Such attacks or misuse may be effected as a prank or for more deliberate reasons. In order to combat such attacks or misuse, intrusion detection is used. Intrusion detection refers to detecting activity on a network that is associated with an attack or misuse on the network.

Intrusion detection conventionally involves examining traffic and comparing it to stored signatures. Stored signatures characterize particular traffic that is known to be associated with attacks on a network, and in this way are analogous to fingerprints, or a person's handwritten signature. A signature stores a set of events or patterns associated with network traffic. A problem with conventional intrusion detection is that generating signatures is a difficult and time consuming process and such generation may take too long to rapidly adjust to new network intrusion threats.

SUMMARY OF THE INVENTION

According to one embodiment of the invention, a method for automatically generating software code operable to detect a defined signature in network traffic comprises providing an inspector shell, generating a plurality of parameter name-value associations from provided configuration data, and automatically generating, by a computer, an instance of the inspector shell having a signature defined by the parameter name-value associations.

Some embodiments of the invention provide numerous technical advantages. Other embodiments may realize some, none, or all of these advantages. For example, according to one embodiment, a user can easily modify the behavior of a predefined signature for network intrusion detection and can do so without replacing binary files, but rather can make such changes using a simple text file. In addition, a user can easily add new network intrusion detection signatures.

Other advantages may be readily ascertainable by those skilled in the art from the following FIGURES, description, and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, and which:

FIG. 3 is a block diagram showing additional details of one engine group of the engine groups of FIG. 2A;

FIG. 4 is a block diagram of a parser of the engine shown in FIG. 3;

FIG. 5 is a flow chart illustrating example steps associated with creation of inspector instances.

FIG. 6 is a block diagram of an inspector instance illustrated in FIG. 3;

FIG. 7 is a flow chart illustrating a method for testing decoded network traffic against stored signatures;

FIG. 9A is a flow chart showing example steps associated with a method for defining a user-defined signature definition to be tested against network traffic;

FIG. 9B is a flow chart showing example steps associated with modifying a default signature to create a modified signature definition; and FIG. 10 is a flow chart showing example steps associated with generating inspector instances based on signature definitions in either a default signature file or a user signature file.

DETAILED DESCRIPTION OF EXAMPLE EMBODIMENTS OF THE INVENTION

Embodiments of the invention are best understood by referring to FIGS. 1 through 10 of the drawings, like numerals being used for like and corresponding parts of the various drawings.

Figure 1:
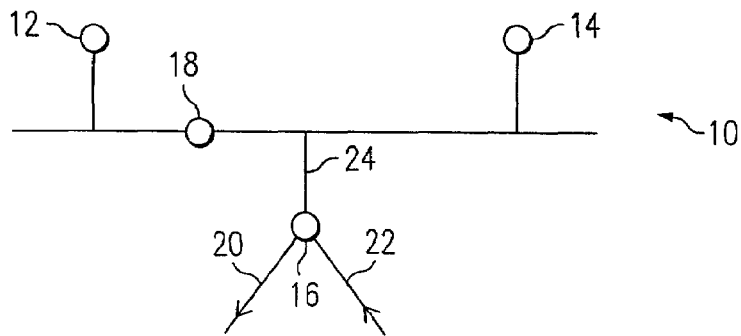
FIG. 1 is a schematic diagram illustrating a network and a sensor for network intrusion that may benefit from the teachings of the invention.

FIG. 1 is a schematic diagram illustrating a network 10 that may benefit from the teachings of the invention. Network 10 comprises one or more network nodes. For illustration purposes, only nodes 12 and 14 are shown. Nodes 12 and 14 represent network devices such as a printer, a work station, a server, or other network device. Also illustrated are a passive sensor 16 and an active sensor 18. Active sensor 18 differs from passive sensor 16 in that it has its own network address.

Passive sensor 16 eavesdrops on local area network 10 and listens to traffic along the network. As sensor 16 does not have a network address, traffic along network 10 is not intended for sensor 16, but nevertheless sensor 16 listens to traffic along network 10. Active sensor 18, in contrast, has an associated network address such that data may be transmitted directly to the sensor along network 10 by specifying its address. Active sensor 18 may be either a sniff-type sensor or a pass through-type sensor. In a sniff-type sensor, traffic goes into the sensor, but does not come out. In contrast, a pass through-type sensor receives traffic and passes it through to other parts of the associated network. Furthermore, active sensor 18 passes traffic intended for other nodes in network 10 through it to other portions of network 10. Although the invention is described below in the context of passive sensor 16, the teachings of the invention are equally applicable to active sensors 18. Sensors 16 and 18 generally compare received network traffic to a signature. A signature refers to a set of events and/or patterns that define a network condition associated with a possible network intrusion attempt.

Sensor 16 has associated with it two communication lines 20 and 22. Communication line 20 is used to provide alarms to a user of sensor 16 (not explicitly shown). Communication line 22, or configuration channel 22, is a configuration channel over which configuration data may be transmitted from a user to sensor 16. Configuration data may include data associated with specifying particular signatures against which sensor 16 examines received traffic. Sensor 16 couples to network 10 through a communication link 24. Communication link 24 may be any suitable communication link for coupling a sensor to a network, such as a network interface card and associated cables.

According to the teachings of the invention, sensor 16 may generate signatures and associated executable programming for comparison to network traffic that are easily customizable and do not require programming language effort. Furthermore, new signatures may be easily added to sensor 16 by either a service provider, or the user itself. In this context, customizing a signature refers to varying values of particular parameters required by the signature, and a new signature refers to a new combination of parameters that must be met. Additional details of example embodiments of sensor 16 are illustrated in FIGS. 2A through 5.

Figure 2A:
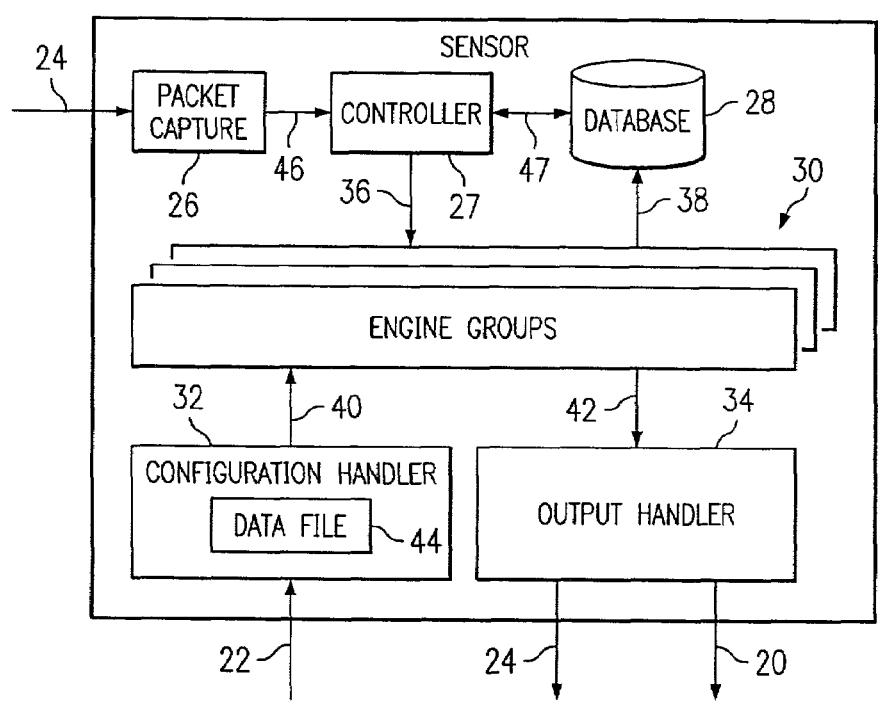
FIG. 2A is a block diagram of a passive sensor of FIG. 1 according to the teachings of the invention.

FIG. 2A is a block diagram of sensor 16, showing additional details of the sensor. Sensor 16 includes a packet capture module 26, a controller 27, a database 28, a plurality of engine groups 30, a configuration handler 40, and an output handler 34. Configuration handler 32 also has associated with it a configuration data file 44. Configuration data file 44 may be stored within configuration handler 32, as shown, or external to configuration handler 32.

Packet capture module 26, or packet capturer 26, receives as its input network traffic over communication line 24 and produces as its output the network traffic in a structured format at line 46. Packet capturer 26 receives packets from, for example, a network interface card. The packets are placed into a common structure for later analysis and transmitted to controller 27 over line 46. The functions of packet capture module 26, and the other components of sensor 16, may be programmed in software or may be hardwired. According to one embodiment, they are written in the C++ programming language; however, other programming languages may be used, if programmed in software.

Controller 27 receives packets from packet capturer 26 over line 46 and directs the packets to an appropriate engine group 30 over line 36. To do so, controller 27 may store registrations of portions of engine groups 30 referred to as inspector instances, described below. These registrations specify the type of traffic that the inspector instances associated with engine groups 30 would like to receive for intrusion detection purposes. In addition, controller 27 distills information and provides it in a structured format to database 28 over line 47 for use in association with detecting traffic signatures that require particular historical activity. These packets will later be examined and compared to stored signatures to determine if the traffic the packets make up constitute a possible network intrusion attempt.

Database 28 provides persistent storage for the distilled structured packets received over line 47 that originated on network 10. Persistent storage is useful to detect traffic patterns that require referring to more than one packet of data. For example, if a portion of the signature to be detected refers to the number of hits made within a particular period of time, more than one packet will need to be analyzed to determine if that portion of the signature is met. Database 28 provides a mechanism for storing different packets for such analysis. According to one embodiment of the invention, database 28 is organized by addresses and by ports associated with the addresses; however, other organization approaches may be utilized, including Layer 2 through Layer 4 attributes. Database 28 may provide its stored information over line 47 back to controller 27, when needed, for transmission to engine groups 30 over line 36. Database 28 also receives updated information directly from engine groups 30 over line 38 that is related to historical activity of traffic over network 10.

Configuration handler 32 receives configuration information over line 22 from a user and also receives configuration information previously written to data file 44. In response, configuration handle 32 generates an input configuration stream 40 for receipt by engine groups 30, as described in greater detail below. Input configuration stream 40 generally includes information describing the characteristics of a signature that will be compared against packets captured by packet capture 26. This configuration data may include values for particular parameters within a pre-defined signature; in such a case the configuration data customizes a signature to the particular needs of a user. Further, configuration data may include a combination of parameters and associated values to define a new signature. Example signatures, parameters, and values are described in greater detail below in conjunction with FIG. 4. Use of configuration data file 44 allows generation of inspector instances 74 (FIG. 3) that are tailored to a particular signature and that are easily modifiable by the user. Inspector instances 74 are described in greater detail below in conjunction with FIGS. 3 through 7, but generally function to compare network traffic against a defined signature.

Output handler 34 generates alarms and actions in response to an indication received over a line 42 from engine groups 30 that network traffic meets a particular signature. An alarm is an indication to a user that a network intrusion has occurred and is transmitted to the user over line 20, also illustrated in FIG. 1. An action is an instruction to network 10 to perform a particular function, such as to shut down, in response to a detected intrusion. Therefore, actions are provided over communication link 24 to network 10.

Engine groups 30 each comprise a collection of similar engines that target similar types of traffic. Each individual engine group includes a plurality of engines, illustrated and described in greater detail in conjunction with FIGS. 3 through 7. Generally, engines perform functions associated with generating signatures and comparing them to received traffic. Each engine may specialize in a kind of protocol decode, analysis, and storage access.

In operation, packets of data are received over line 24 by packet capture unit 26. Packet capture unit 26 organizes this information into a structured format and provides such structured information over line 46 to Controller 27. Controller 27 provides the structured packets to engine groups 30, as well as information distilled from these packets to database 28 for storage. Engines within engine groups 30 compare stored signatures with the received traffic to determine whether a signature is met, as described in greater detail in conjunction with FIGS. 3 through 7. If a signature is met, an indication is provided over line 42 to output handler 34. In response, output handler 34 generates either an alarm and provides the alarm over line 20 to a user or takes action and, for example, shuts the network down through communication over line 24 to network 10.

Before such network intrusion detection may take place, functionality for describing a signature must first be developed. This is performed in conjunction with configuration handler 32. In operation, configuration handler 32 receives configuration data over line 22 and stores the configuration data in configuration data file 44. Configuration data file 44 may be provided initially by the manufacturer of sensor 16, may be provided as an update by the manufacturer, or may be customizable by the user. Configuration handler 40 passes this information to an engine with an engine group 30, which generates an appropriate signature and associated functionality for comparing the signature to network traffic (inspector instance 74) for later use, as described in greater detail in conjunction with FIG. 4. Generation of the appropriate signature is described in greater detail below in conjunction with FIGS. 3 through 7 and additional details of configuration handler 32 are described in conjunction with FIGS. 8A through 10.

Figure 2B:
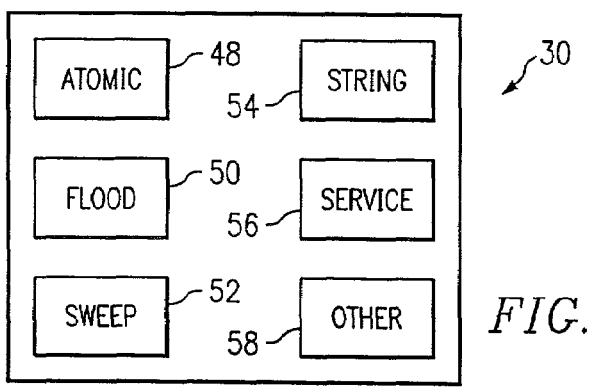
FIG. 2B is a block diagram of a plurality of engine groups of FIG. 2A.

FIG. 2B is a block diagram illustrating more clearly engine groups 30. As described above, engine groups 30 refer to a collection of similar engines that target similar types of traffic. Illustrated are six engine groups. Those engine groups are atomic 48, flood 50, sweep 52, string 54, service 56, and other 58.

An engine, such as engine 62 (FIG. 3), generally includes functionality that allows creation of signatures as well as generation of functionality that compares such signatures to network traffic, and are described in greater detail in conjunction with FIGS. 3 through 7. Engines have associated parameters and value ranges for the parameters that define the associated signatures.

Atomic engine group 48 comprises engines associated with detecting single packets of data that cause an alarm and are directed to Layer 3 and Layer 4 single packet attributes. For example, an atomic engine would detect a possible alarm by examining the header of a packet of data and comparing header attributes against sets of known malicious attributes.

Flood engine group 50 comprises flood engines. Flood engines are associated with detecting attacks on a network from many hosts targeting a single host. In such a case, an attempt is made to overwhelm service in a particular victim and deny service to that victim. Flood engines within flood engine group 30 are associated with detecting such attacks. Flood engines may use comparisons similar to atomic engines with the addition of a many-to-one storage access.

Sweep engine group 52 comprises sweep engines. Sweep engines are associated with one attacker sweeping many possible victims. Such traffic is generally associated with reconnaissance of a host on a network to determine which host might be vulnerable. Sweep engines may involve both a sweep of a plurality host or a sweep of a plurality of ports on a particular port. As such, sweep engines may use one-to-one or one-to-many storage with a unique port or host counter. In such a case, an attacker may be trying to identify what services are offered by a particular host, such as nodes 12 and 14.

String engine group 54 comprises a plurality of string engines. String engines look for a particular pattern of characters in the network traffic, such as, for example, the character string "cmd.exe_." Either a particular string may be looked for or a normalized version of the string may be sought. A normalized version refers to the interpretation of modifications of a particular string that may be made to avoid detection.

Service engine group 56 comprises a plurality of service engines. Service engines generally do not fit into any of the previously described categories and are associated with detecting attacks on a network that are associated with targeting specific services. Detection of attacks targeting the FTP, DNS, or RPC services may fall within this group, and in particular, Layer 5 through 7 attributes.

Other engine group 58 comprises all other types of engines that do not fall within any of the previously described categories. An example of such may be an engine associated with Trojan traffic, such as back doors, and the detection of traffic anomalies.

According to the teachings of the invention, each of engine groups 30 comprises a plurality of engines that allow the generation and use of customizable signatures. Being able to easily customize signatures and create new signatures results in a more efficient and user friendly user detection system. FIGS. 3 through 7 describe additional details of the generation and use of such signatures.

FIG. 3 is a block diagram showing additional details of atomic engine group 48. Atomic engine group 48 is illustrated in greater detail in FIG. 3 to better describe an embodiment of the invention; however, it should be understood that the engines within the other previously described engine groups 30 may be formed similarly. Atomic engine group 48 includes a plurality of engines 60. Engines 60 each generally create functionality that is able to analyze signatures and execute such functionality against received traffic. Engines 60 comprise, in this example, an atomic.IP engine 62, an atomic.TCP engine 64, an atomic.ICMP engine 66, and an atomic.UDP engine 68. As shown, the engines are distributed based upon the Layer 3-4 protocol of the traffic being analyzed. In this example, a separate engine within any engine group is provided for each of the four protocols IP, TCP, ICMP, and UDP. "IP" refers to Internet Protocol. "TCP" refers to transmission control protocol. "ICMP" refers to Internet controlled message protocol. "UDP" refers to user datagram protocol.

Components of atomic.IP engine 62 are described in greater detail below. Atomic.IP engine 62 includes a parser 70, an inspector shell 72, and a plurality of inspector instances 74, in the illustrated stage of processing. This depiction of the components of atomic.IP engine 62 are at a time period after inspector instances 74 have been created, as described below.

Parser 70 receives configuration data over line 40 from configuration handler 32 of FIG. 2A. In general, parser 70 takes the configuration input, interprets and validates it and places it into a run time ready form, which is optimized. The run time ready structure is then used by an inspector creator 93 (FIG. 4) to generate an inspector instance 74 that incorporates the received configuration data based on inspector shell 72, as depicted by line 80. Additional details of the operation of parser 70 are described in greater detail below in conjunction with FIG. 4.

Inspector shell 72 is a generic shell of an inspector that is used to create particular inspector instances 74 defined by the configuration data received over line 40. Inspector shell 72 comprises a plurality of structures and methods for fine tuning for an engine specific purpose. Additional details of inspector shell 72 are described in greater detail below in conjunction with the description of inspector instances 74 with respect to FIGS. 4 through 6.

Inspector instances 74 actually perform traffic inspection and compare the inspected traffic to known signatures to detect intrusion. Inspector instances 74 receive traffic over line 36 from controller 27. Inspector instance 74 also receives network traffic from database 28 of FIG. 2A that is stored in database 28 for later retrieval over line 36. Inspector instance 74 generates an indication of whether a particular signature has been detected and provides that over line 42 to output handler 34 of FIG. 2A. Inspector instance 74 is closely associated with a signature 76. Signature 76 is a definition of the pattern of traffic to be recognized and may be defined by a plurality of parameters and associated values. In contrast, inspector instance 74 also includes functionality for analyzing network traffic against signature 76 and determining whether the analyzed traffic meets the definition of signature 76.

Two modes of operation are associated with atomic IP engine 62. The first mode is a configuration mode in which inspector instances 74 are generated. The second mode is a run time mode in which detected network traffic is analyzed with respect to known signatures.

In configuration mode, the operation is described as follows. Parser 70 receives configuration data over line 40 and formats it. Based on inspector shell 72, a plurality of inspector instances 74 are created that include the configuration data received over line 40. Such configuration data comprises a plurality of parameter name-value pairs associated with fields that may appear in traffic. For example, the following phrase "engine atomic.TCP sigid 1 p1 v1 p2 v2 p3 v3" may be a string that is detected. The portion "sigid" is a field referring to the signature identification, and the number "1" refers to the identification of the signature. Thus, the configuration data, or parameter name-value pairs are represented within signature 76 of inspector instance 74. Additional details of this process are described in conjunction with FIG. 4.

At run time, inspector instance 74 receive traffic and stored traffic over line 36. This information is compared to stored signature 76 and an indication of whether the traffic meets a defined signature is provided over line 42 by inspector instance 74. As shown, there are a plurality of inspector instances 74 each looking for a different particular signature. Thus, once a particular network data stream has been analyzed for a first signature the other signatures are then serially processed; however, this could be done in a parallel fashion. Additionally, because there are a plurality of engines groups, the captured traffic is also provided to each group for processing for any given type of protocol. For example, all Internet protocol traffic would be directed to the various ".IP" engines. In one example this is performed in a serial fashion; however, it could also be performed in a parallel fashion.

FIG. 4 is a block diagram of a parser 70 of FIG. 3, showing additional details of parser 70. Parser 70 receives as an input configuration data on line 40 and produces a parameter list stored as a run time ready structure 90 for use by an inspector creator 93 in order to create an inspector instance 74 based on inspector shell 72.

Parser 70 includes a tokenizer 84, an internalizer 86, an error handler 88, run time ready structure 90, and inspector creator 93; however, any of these components may be located external of parser 70, including inspector creator 93.

Tokenizer 84 receives configuration data over configuration line 40 from configuration handler 32 (FIG. 2A). An example of configuration data received by tokenizer 84 is illustrated in Table 1.

TABLE 1

Example Configuration Data

Engine MOTION SIGID 1 isCat TRUE numHits 3 duration 4
Engine MOTION SIGID 2 isCat FALSE numHits 4 duration 6
Engine MOTION SIGID 3 isDog TRUE numHits 7 duration 9
Engine MOTION SIGID 4 isDOG FALSE isCat FALSE numHits 1000 duration 10000
Engine MOTION SIGID 5 isDOG FALSE isCat FALSE numHits 9 duration 3

The first line of the configuration data illustrated in Table 1 is described in detail below. In this example, the parameter "Engine," which stands for the selected engine, has a value of "MOTION." This indicates the engine is "MOTION." The parameter "sigid," which stands for signature identification, has a value of "1." This indicates that the name of the signature defined is "1." The parameter "isCat" has a value of "TRUE," indicating that value of the "isCat" parameter is "TRUE." The parameter having a name of "numHits" has a value of three, indicating in this example that the number of hits is three. The parameter having a name of "duration" has a value of four indicating a four seconds interval is used for sampling. This set of parameter name-value pairs represents the definition of a particular signature to be tested and is easily modifiable to create new signatures or to tweak this signature, such as by changing the number it hits from "3" to "4."

Tokenizer 84 recognizes portions of configuration data and associates values contained within the configuration data with parameter names. Thus, tokenizer creates one or more name-value pairs. An example of a set of parameter name-value pairs defining a particular signature based on the example configuration data of Table 1 is illustrated in Table 2. The parameter name-value pairs are provided to internalizer 86 over line 92.

TABLE 2

Example of Name-Value Associations

| | | | | |
|---|---|---|---|---|
| SIGID 1 | ((isCat TRUE)) | ((isDog ANY)) | ((numHits 3)) | ((duration 4)) |
| SIGID 2 | ((isCat FALSE)) | ((isDog ANY)) | ((numHits 4)) | ((duration 6)) |
| SIGID 3 | ((isCat ANY)) | ((isDog TRUE)) | ((numHits 5)) | ((duration 9)) |
| SIGID 4 | is reported as error because numHits is greater than its allowed range of 1–8. This signature is dropped due to this illegal content condition. | | | |
| SIGID 5 | ((isCat ANY)) ((isDog TRUE)) ((numHits 9)) ((duration 3)) The second layer of error trap reports an error on SIGID 5 because the numHits value is greater than duration. This is an illegal context condition that causes the signature to be dropped. | | | |

As another example, configuration data received over configuration line 40 may take the following form: "engine atomicTCP sigid 1 p1 v1 p2 v2 p3 v3." In this example, the engine is defined as "atomic.TCP," the signature identification is defined as "1." The parameter p1 is defined to have a value of v1. The parameter p2 is assigned a value of v2. And the parameter p3 is assigned a value of v3. Tokenizer 84 recognizes the names of the parameters and associates the value assigned to it to create a table of parameter name-value pairs, such as the one shown in Table 2. The parameter name-value pairs are then provided to internalizer over line 92.

This approach of configuring signatures contrasts with approaches that do not receive configuration data in the above form or do not create a set of parameter name-value pairs. For example, conventional configuration data may take the form of "sigofstring 2301 0 2 0 cmd.exe." In this instance, each of the values within this string are examined according to a preset protocol that indicates what each digit represents. Using such a protocol makes it difficult for user configuration of signatures, and thus constrains flexibility, as well as identification by a parser of equivalent parameters. For example, in order to define the required value of any particular parameter in a signature definition, values for all parameters the protocol used had to be provided because of the protocol used for defining the signature. In contrast, according to the teachings of the invention only parameter name-value pairs were provided with respect to parameters that matter with respect to any given signature, which is useful because many signatures do not care what the value is for many possible parameters.

In addition to generating a list of parameter name-value pairs tokenizer 84 also generates errors when appropriate and provides an indication that an error has occurred over line 94 to error handler 88. For example, if the name of a parameter "p1" is not recognized as a valid parameter, an error may be generated. Similarly if a named parameter is recognized but fails to have an associated value, an error indication may be generated.

In one embodiment, internalizer 86 receives parameter name-value pairs and verifies that the values are within acceptable ranges for each parameter. If they are not, an error indication is generated and provided to error handler over line 96. For example, a value for a "number of hits" parameter that uses less than zero or a non-integer would result in an error indication. In addition, in one embodiment, internalizer 86 also performs optimization functions in which it creates the specific internal data structures that may be used to optimize performance. Internalizer 86 generates a run time ready form and compact data structure and stores the information and run time ready structure 90. This generation may be performed in any suitable manner. In one example, each line of this structure represents a separate signature. An example of run time ready structure 90, now in matrix form, is illustrated in Table 3 for the name value associations of Table 2. These signatures are available over line 91 to inspector creator 93 for creation of a plurality of inspector instances 74 that have a signature 76 corresponding to a particular line of run time ready structure 90.

TABLE 3

Example Run Time Ready Matrix Structure

|  | CAT TRUE | CAT FALSE | CAT ANY |
|---|---|---|---|
| DOG TRUE | 0,0,0,0,0,0,0,0 | 0,0,0,0,0,0,0,0 | 0,0,0,0,(9,3),0,0,0 |
| DOG FALSE | 0,0,0,0,0,0,0,0 | 0,0,0,0,0,0,0,0 | 0,0,0,0,0,0,0,0 |
| DOG ANY | 0,0,(4,1),0,0,0,0,0 | 0,0,0,(6,2),0,0,0,0 | 0,0,0,0,0,0,0,0 |

Each cell in the matrix represents each CAT and DOG combination. The cell contains 8 ZEROs or PAIRs.
The position in the cell denotes the numHits value. If the cell value is not ZERO, then a PAIR is used. The PAIR represents two values (Duration, SIGID).

Error handler 88 receives error indications from either tokenizer 84 or internalizer 86 communicates indication of such error to output handler 34 of the sensor 16 over line 42.

Inspector creator 93 receives a line of data from run time ready structure, which represents a defined signature, and also receives inspector shell 72, and generates inspector instance 74 that includes specific parameters associated with the defined signature. A flow chart showing example steps associated with generating inspector instance 74 is illustrated in FIG. 5. Inspector creator 93 may also be stored external to parser 70, if desired.

In operation, parser receives configuration data over configuration line 40. Such data is provided to tokenizer 84 where parameter name-value pairs are generated and provided to internalizer 86. Internalizer 86 creates a compact data structure to form run time ready structure 90. Run time ready structure 90 is made available over line 91 to inspector creator 91. Inspector creator 91 creates an inspector instance based on inspector shell 72 and run time ready structure 90 to create an inspector instance 74 associated with a particular signature.

In this manner, configuration data may be provided by a user or by a sensor system provider that allows easy modification of signatures or generation of new signatures due to the use of parameter name-value pair lists that define the signatures. An example procedure for a user to define a new signature is described below in conjunction with FIGS. 8A through 9B.

FIG. 5 is a flowchart of a method for creating an inspector instance 74 based on an inspector shell 72 and a signature definition. The method begins at step 230. At a step 232, the structures and methods from inspector shell 72 are inherited by inspector instance 74. Such inheritance may be performed by suitable coding within inspector creator 93, or other module, according to conventional techniques, or through other techniques. At a step 234, inspector instance 74 is directed to point to the particular line of the runtime-ready structure 90 storing data associated with the associated signature definition. At a step 236, the data members are initialized. Initializing data members associated with inspector instance 74 refers to setting variables to their default, or starting values. The method continues at a step 238 where the defined inspector instance 74 registers its interest with controller 27 in traffic in which it desires to inspect. This allows controller 27 to appropriately select inspector instances 74 when needed. The method concludes at step 240.

In some embodiments, a copy of any given inspector instance 74 may be made, if desired, to process each distinct connection on network 10. A distinct connection refers to a connection between any two nodes having addresses on network 10. Such copies of inspector instance 74 could be stored anywhere, but in one case are stored in sensor 16 external of engine groups 30. The method concludes at step 240.

FIG. 6 is a block diagram of inspector instance 74 showing additional details of the inspector instance. Inspector instance 74 receives network traffic information over line 36 and generates an alarm or an event over line 42 for receipt by output handler 34 when a particular signature is detected. Network traffic is received over line 36 by a protocol decoder 98.

Protocol decoder 98 decodes a packet of the network traffic. This decoding may include a basic decode and protocol specific decode, such as decoding specific strings associated with the FTP protocol. The result of the decoding performed by protocol decoder 98 is the generation of parameter name-value pairs. These parameter name-value pairs are provided to comparator and evaluator 100 over line 102.

Comparator and evaluator 100 is a specialized version of a comparator and evaluator and in inspector shell 72 that includes parameters 104. Parameters 104 are received during configuration from run time ready structure 90 during generation by inspector creator 93 of particular inspector instance 74, as described above. Comparator and evaluator 100 receives parameter name-value pairs from protocol decoder and tests those parameters against the parameter name-value pairs represented by parameters 104. Such parameter name-value pairs represent a particular signature that is tested. If the parameter name-value pairs provided to comparator and evaluator 100 match the parameter name-value pairs of parameters 104, this indicates that a particular signature is met. In response to a particular signature being met, an indication of a signature being met is provided along line 42 for receipt by output handler 34 of FIG. 2A for generation of either an alarm or an action, or both.

Comparator and evaluator 100 also receives information along line 36 and line 102 related to historical occurrences of packets over network 10. For example, previous hits on a particular device may be stored in database 28 (FIG. 2A). This information is provided to comparator and evaluator 100 when the tested parameter involves historical usage. In addition, comparator and evaluator provides updated historical information to database 28 over line 38.

In operation, inspector instance 74 receives over lines 36 packets of data. Protocol decoder 98 decodes the packets received over line 36 and provides the decoded information to comparator and evaluator 100. Comparator and evaluator 100 thus determine if the decoded packets of data meet the signature being tested and provides the result on line 42. Example details of functions performed by comparator and evaluator 100 are described below in conjunction with flowchart of FIG. 7.

FIG. 7 is a flowchart showing example steps associated with comparator and evaluator 100 testing for network intrusion. The method begins at step 106. At a step 108, a filter is applied to the decoded data received over line 102 to filter out parameter values at the signature being tested for does not care about. For example, assume a particular signature being tested for had parameters having the names "A," "B," "C," and "D" while the network data stream tested had a parameter "E." Further analysis would not be performed with respect to the parameter E because the defined signature does not care about the value of parameter E. At step 110 a first parameter within the parameters that the signature does care about is tested (for example, "A"). This involves determining whether the value of the particular parameter in the signature matches the value of the parameter within the received data stream. If the condition is met at step 112 processing continues at step 114. If the condition is not met at step 112 this indicates that the signature is not met and processing concludes at step 120.

At step 114 a determination is made of whether there are any more parameters to be tested. If there are no more parameters to be tested, then this indicates that all parameters were met and the signature has been matched. Processing continues at step 116 where an indication that the signature has been met has been generated at step 116 over line 42 for receipt by handler 34 of FIG. 2A. If at step 114 there are additional parameters to test, processing continues at step 110 until all parameters have been exhausted or any condition is not met. Processing halts at step 120.

By testing parameters individually and halting subsequent testing once one parameter is not met, intrusion detection may be performed in a more efficient manner than would occur if testing of all parameters were required. Furthermore, testing only parameters defined by the signature avoids undue delay associated with testing all parameters in a data stream, only to later determine that such testing was irrelevant because the defined signature does not require specific conditions associated with some of the tested parameters be met.

Figure 8A:
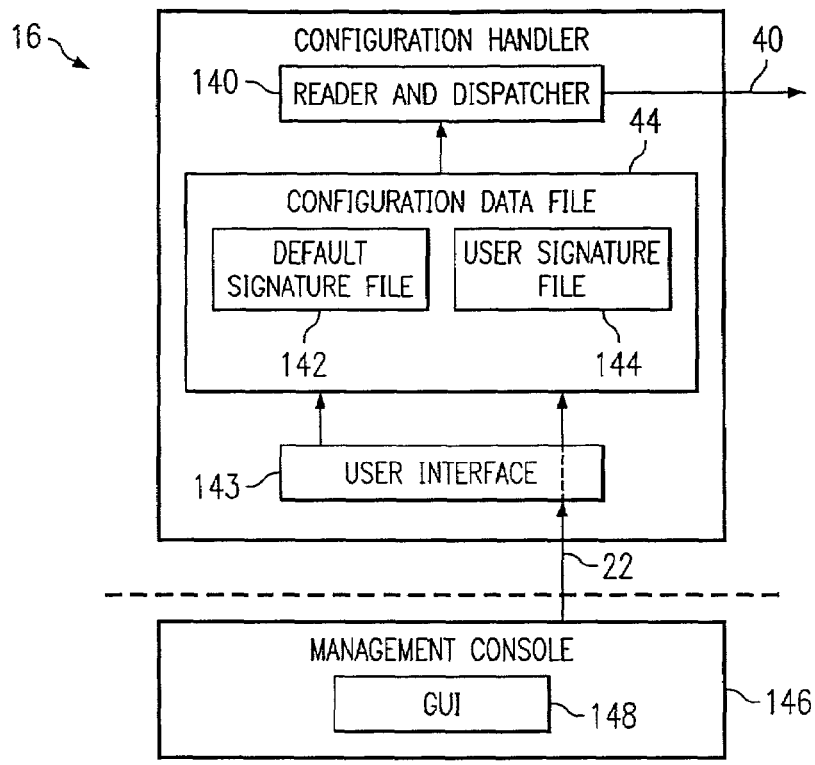
FIG. 8A is a block diagram of the configuration handler of FIG. 2A showing additional details of the configuration handler.

FIG. 8A is a block diagram of configuration handler 16 showing additional details of the configuration handler. Configuration handler 16 comprises a reader and dispatcher 140, configuration data file 44, and a user interface 143. Associated with configuration handler 16 is a management console 146. As illustrated, management console 146 is stored external to sensor 16 in this example; however, management console 146 could be stored on sensor 16. Configuration handler 16 provides configuration data over line 40 to engine groups 30, as described above. Such configuration data may be based on information received from a user through management console 146 through line 22. Management console 146 may include a graphical user interface 148.

User interface 143 receives configuration data over line 22 from management console 146 and stores it appropriately in configuration data file 44.

Configuration data file 44 includes a default signature file 142 and a user signature file 144. Default signature file 142 stores default signatures to be detected. Default signatures may be provided by a sensor provider and periodically updated with new signatures. User file 144 stores both user-defined signatures and modifications of default signatures. According to one embodiment, a modified signature definition stored in user signature file 144 includes parameters and associated values for only the parameters and associated values that are modified from the default signature. In other words, unmodified values are not additionally stored in the modified signature definition in user signature file 144. User interface 143 provides configuration data received from management console 146 to user signature file 144. This information may include user-defined signatures or modifications to default signatures.

An example of default signature file 142 and user signature file 144 is illustrated in Tables 4 and 5, respectively. As illustrated, both default signature file 142 and user signature file 144 store one signature per line in this example; however other formats may be used.

TABLE 4

Example Default Signature File

Engine SWEEP.HOST.TCP ThrottleInterval 30 ChokeThreshold 100 ResetAfterIdle 20 AlarmThrottle FireAll
Engine SWEEP.HOST.TCP SIGID 3030 Unique 15 AlarmThrottle Summarize WantFrag FALSE TopFlags SYN Mask SYN|FIN|ACK SigName TCP SYN Host Sweep
Engine SWEEP.HOST.TCP SIGID 3031 Unique 5 WantFrag TRUE TcpFlags SYN Mask SYN|FIN|ACK SigName TCF FRAG SYN Host Sweep
Engine SWEEP.HOST.TCP SIGID 3032 Unique 5 WantFrag FALSE TcpFlags FIN Mask SYN|FIN|ACK SigName TCP FIN Host Sweep
Engine SWEEP.HOST.TCP SIGID 3033 Unique 5 WantFrag TRUE TcpFlags FIN Mask SYN|FIN|ACK SigName TCP FRAG FIN Host Sweep
Engine SWEEP.HOST.TCP SIGID 3034 Unique 5 WantFrag FALSE TcpFlags ZERO Mask FIN|SYN|RST|PSH|ACK|URG SigName TCP NULL Host Sweep
Engine SWEEP.HOST.TCP SIGID 3035 Unique 5 WantFrag TRUE TABLE 4-continued Example Default Signature File TcpFlags ZERO Mask FIN|SYN|RST|PSH|ACK|URG SigName TCP FRAG NULL Host Sweep
Engine SWEEP.HOST.TCP SIGID 3036 Unique 5 WantFrag FALSE
TcpFlags SYN|FIN Mask SYN|FIN|ACK SigName TCP SYN/FIN Host Sweep
Engine SWEEP.HOST.TCP SIGID 3037 Unique 5 WantFrag TRUE
TcpFlags SYN|FIN Mask SYN|FIN|ACK SigName TCP FRAG SYN/FIN Host Sweep

TABLE 5

Example User-Defined Signature File

Engine SWEEP.HOST.TCP SIGID 3031 Unique 20
Engine SWEEP.HOST.TCP SIGID 3037 Unique 5 AlarmThrottle Summarize
Engine SWEEP.HOST.TCP SIGID 3031 Unique 20
Engine SWEEP.HOST.TCP SIGID 3037 Unique 5 AlarmThrottle Summarize
Engine SWEEP.HOST.TCP SIGID 20000 Unique 5 WantFrag TRUE
TcpFlags SYN|PSH Mask SYN|FIN|ACK|PSH SigName TCP FRAG SYN/PSH Host Sweep
Engine SWEEP.HOST.TCP SIGID 20001 Unique 5 WantFrag FALSE
TcpFlags Reader and dispatcher 140 reads, at an appropriate time, default signature file 142 and user signature file 144 and transmits the stored information over line 40 to engine groups 30 to create an inspector instance 74 for detecting a network intrusion associated with a particular signature.

Figure 8B:
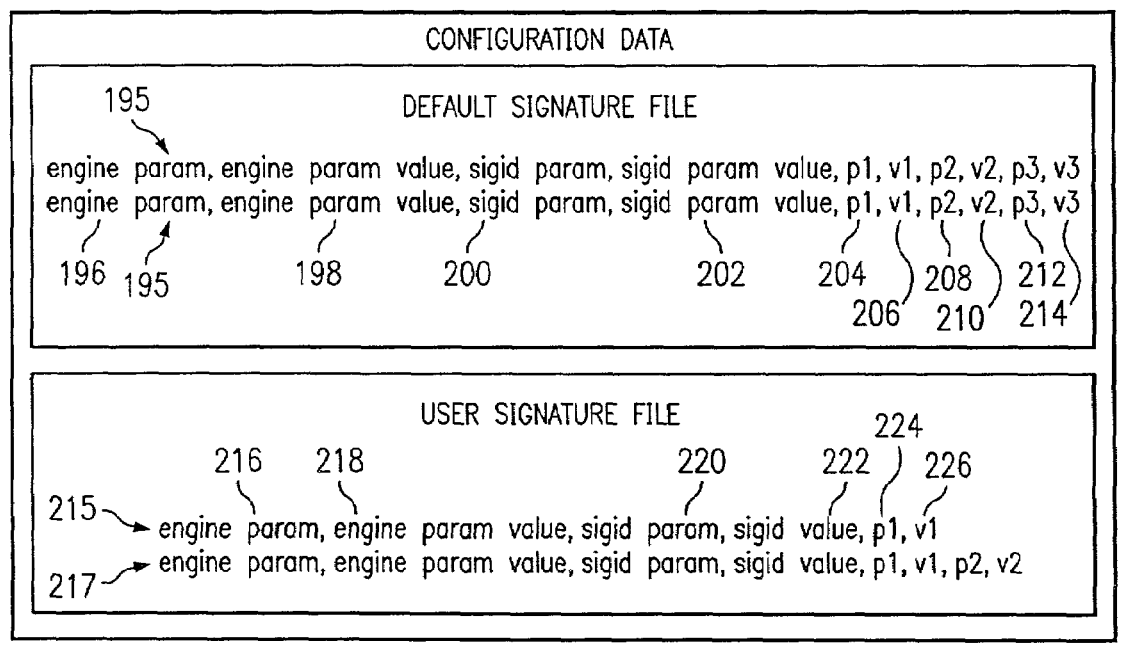
FIG. 8B is a block diagram of the configuration data file of FIG. 8A, showing additional details of a default signature file and a user signature file.

FIG. 8B is a block diagram of configuration data file 44 showing additional details of default signature file 142 and user signature file 144. Default signature file comprises a plurality of signature definitions 195. As illustrated, each signature definition 195 is stored on a separate line of default signature file 142; however, other suitable formatting may be used. Each signature definition comprises an engine parameter 196, an engine parameter value 198, a signature identification parameter 200, an identification parameter value 202, and a plurality of parameters defining the signature, 204, 208, 212, with respective values, 206, 210, 214.

User signature file 144 also stores one or more signature definitions. These stored signature definitions may include a plurality of modified signatures 215 and a plurality of user-defined signatures 217. Modified signatures 215 are based upon previously defined signatures defined in default signature file 142 whereas user-defined signatures 217 do not represent modifications of default signature stored in default signature file 42, but rather user-defined signatures. In general, a user-defined signature definition 217 will comprise a combination of parameters that does not exist in default signature file 142. In contrast, a modified signature definition defines a signature that has the same parameters as a default signature, but that has at least one value for a parameter that is different from the default signature.

As illustrated in FIG. 8B, modified signature definition 215 comprises an engine name parameter 216, an engine name parameter value 218, a signature identifier parameter 220, a signature identifier value 222, and at least one parameter 224 and associated value 226 that is modified as compared to a stored default signature 195 having the same signature identifier value 222. User-defined signatures 217 are analogous to default signatures 195, and include an engine name parameter and associated value, a signature identification parameter and associated value, and one or more parameters and associated values.

FIG. 9A is a flowchart showing example steps associated with a method for defining a user-defined signature definition to be tested against network traffic. The method begins at step 152. At a step 154 a sensor is selected. Such a sensor selection may occur in a case where management console 146 is associated with a plurality of different sensors 16. At a step 156, an engine for the selected sensor is selected. Such selection of an engine may include a review of documentation provided by the sensor manufacturer or receiving online information describing engines from which to select. At a step 158, a list of possible parameters for the selected engine is provided. Such a list may be communicated to a management console 146, or other device, by, for example, user interface 143.

At a step 160, parameters are selected from the provided list to define the user-defined signature. At a step 162, values are specified for the selected parameters. These values and their associated parameters define the type of behavior associated with the signature that is to be detected to detect possible network intrusion. At a step 164, a signature identification number and name are specified for the user-defined signature. At a step 166, the user-defined signature defined by the signature identification number and name, and the plurality of specified values and parameters, is written to user signature file 144. The method concludes at step 168.

Although the above method was described in the context of configuration handler 32, other combinations of hardware and software may be used in association with this method. Such a method provides a simple and efficient way to define a new signature for intrusion detection.

FIG. 9B is a flowchart showing example steps associated with modifying a default signature to create a modified signature definition. The method begins at step 170. At a step 172 an engine is selected. Such an engine may have associated with it a plurality of default signatures. At a step 174 a signature to be modified, or customized, is selected from the plurality of default signatures. This selection may take place through use of graphical user interface 148 associated with management console 146 or through other methods.

At a step 176 a list of parameters and associated default values for the selected signature is provided. Example of parameters that may be used with certain engines in example engine groups 30 are illustrated in Table 6 at the end of this section; however, other parameters may also be used. Such providing of parameters may occur through user interface 143 accessing default signature file 142 and providing the parameters and associated default values, or through other suitable techniques. At a step 178 a user may change the default values for desired parameters that are not protected. Protected parameters refer to parameters for which the associated default values may not be modified. At a step 180, the engine, the signature identification name, and parameter and modified values only are written to the user signature file 144. Parameters that have associated default values that were not modified are not written to the user signature file, according to one embodiment. The method concludes at step 182.

Although the above method was described in the context of configuration handler 32, other combinations of hardware and/or software may be used in association with this method. Such a method provides a simple and efficient way to modify existing signatures for intrusion detection.

FIG. 10 is a block diagram showing example steps associated with generating inspector instances based on signature definitions in either default signature file 142 or user signature file 144. Such a procedure may be performed by sensor 16 after receiving an updated default signature file from a manufacturer, or at any other desired time. The method begins at step 184. At a step 186 the default signature file 142 is read. This may involve reader and dispatcher 140 reading default signature file 142 and providing that information over line 40 to parser 70 within engine 62 of engine groups 30, as described above. Based on the read information from default signature file 186, inspector instance 74 is generated based on default signature file 142 for each default signature defined. At a step 190 user signature file 144 is read. Reading of user signature file 190 may occur in a manner analogous to the reading of default signature file 142. This information is then provided to parser 70 of engine 62. Based upon this information and inspector shell 72, a modified inspector instance 74 is created for the modified signature. At a step 193, inspector instances 74 based on user-defined signatures stored in user signature file 144, such as user-defined signature 217, are generated. The method concludes at step 194.

Such a method may allow generation of executable code for detecting intrusions meeting particular signatures in an easy and efficient manner and also allows rapid deployment of default and custom signatures.

TABLE 6

Example Parameters

ENGINE NAME - PARAMETER NAME
(DATATYPE [: value range or limiters]) [PROTECTED]
[HIDDEN] [REQUIRED]
Description
Note that PROTECTED, HIDDEN, REQUIRED are shown only if this condition is
true. Non-Protected, Non-Hidden (aka Readable), and Non-Required are not
shown for brevity.
Atomic Engine Parameters
ATOMIC.ICMP - AlarmInterval
(NUMBER: 20–3600)
Duration to aggregate alarms. After AlarmInterval
seconds following the first alarm on a dataset, the
counters are reset to zero. The Alarm will fire when you
get (Alarm Hits >= MinHits) in AlarmInterval seconds.
ATOMIC.ICMP - AlarmThrottle
(ENUM: FireAll FireOnce Summarize GlobalSummarize)
Technique used to limit alarm firings. FireAll will
always send alarms when the signature alarm condition is
met. FireOnce will send only the first alarm, and then
NOT SEND anymore on this particular address set.
Summarize will send one alarm per-ThrottleInterval, per-
address set. The first alarm is sent normally.
Subsequent alarm are counted until the end of the
ThrottleInterval, when a SUMMARY ALARM is sent.
GlobalSummarize will send only one alarm per-
ThrottleInterval, for all address sets currently being
monitored. This limits alarms in a ThrottleInterval to 1
per-signature across the whole sensor so you can reduce
the alarm bandwidth of flood attacks.
ATOMIC.ICMP - ChokeThreshold
(NUMBER)
Threshold value of alarms-per-interval to auto-switch
AlarmThrottle modes. If ChokeThreshold is defined and NOT
set to ANY, the sensor will automatically switch
AlarmThrottle modes. The switch is based on per-sensor
counts of each signature frequency in the
ThrottleInterval. If the per-interval frequency of
alarms of a signature is greater than ChokeThreshold, the
mode is switched to Summarize. If the per-interval
frequency is greater than TWICE the ChokeThreshold, the
mode is switched to GlobalSummarize. See the ENGINE
PARAMETERS SUPPLEMENT for more details.
ATOMIC.ICMP - FlipAddr TABLE 6-continued Example Parameters (BOOL: TRUE FALSE)
TRUE if address (and ports) Source and Destination are
swapped in the alarm message. FALSE or ANY for no swap.
ATOMIC.ICMP - IcmpCode
(NUMBER)
ICMP header CODE value
ATOMIC.ICMP - IcmpId
(NUMBER)
ICMP header IDENTIFIER value
ATOMIC.ICMP - IcmpMaxCode
(NUMBER)
Maximum allowed IcmpCode
ATOMIC.ICMP - IcmpMaxSeq
(NUMBER)
Maximim allowed IcmpSeq
ATOMIC.ICMP - IcmpMinCode
(NUMBER)
Minimum allowed IcmpCode
ATOMIC.ICMP - TcmpMinSeq
(NUMBER)
Minimum allowed IcmpSeq
ATOMIC.ICMP - IcmpSeq
(NUMBER)
ICMP header SEQUENCE value
ATOMTC.ICMP - IcmpType
(NUMBER) PROTECTED
ICMP header TYPE value
ATOMIC.ICMP - InspectionGroup
(NUMBER: 0–10000) HIDDEN
Special inspection short-circuit group (expert use only).
ATOMIC.ICMP - IpTOS
(NUMBER)
IP header TYPE OF SERVICE value
ATOMIC.ICMP - MaxInspectLength
(NUMBER)
Maximum number of bytes to inspect
ATOMIC.ICMP - MinHits
(NUMBER: 0–1000)
Minimum number of signature hits before the alarm message
is sent. This a throttle for firing the alarm only after
X times of seeing the signature on the address key.
ATOMIC.ICMP - Protocol
(BITSET: RPORTMAP IP TCP UDP ICMP RSWEEP TPORTSWEEP
RPC) HIDDEN REQUIRED
Protocol of interest for this inspector (expert use
only).
ATOMIC.ICMP - ResetAfterIdle
(NUMBER: 15–1000)
Number of seconds to wait to reset signature counters
after the host(s) were idle.
ATOMIC.ICMP - SigComment
(STRING)
USER NOTES - miscellaneous information about this
signature.
ATOMIC.ICMP - SIGID
(NUMBER: 1000–50000) PROTECTED REQUIRED
Signature Identifier. 1000–19999 valid for default
signatures. 20000–50000 valid for user signatures.
ATOMIC.ICMP - SigName
(STRING) PROTECTED
Official name of the signature.
ATOMIC.ICMP - SigStringInfo
(STRING)
Extra information included in the alarm message.
ATOMIC.ICMP - StorageKey
(ENUM: GLOBALSRC DST DUAL QUAD STREAM CUSTOM)
HIDDEN REQUIRED
Type of Address Key used to store persistent data (expert
use only).
ATOMIC.ICMP - SubSig
(NUMBER)
Sub-Signature ID. Denotes a specific variant of a
signature.
ATOMIC.ICMP - ThrottleInterval
(NUMBER: 0–1000)
Number of seconds defining an Alarm Throttle interval.
This is used with the AlarmThrottle parameter to tune

TABLE 6-continued

Example Parameters special alarm limiters.
ATOMIC.ICMP - WantFrag
(BOOL: TRUE FALSE) PROTECTED
TRUE if a fragment is desired. FALSE if a fragment is
not desired. ANY for either.
String Engine Parameters
STRING.HTTP - AlarmInterval
(NUMBER: 20–3600)
Duration to aggregate alarms. After AlarmInterval
seconds following the first alarm on a dataset, the
counters are reset to zero. The Alarm will fire when you
get (Alarm Hits >= MinHits) in AlarmInterval seconds.
STRING.HTTP - AlarmThrottle
(ENUM: FireAll FireOnce Summarize GlobalSummarize)
Technique used to limit alarm firings. FireAll will
always send alarms when the signature alarm condition is
met. FireOnce will send only the first alarm, and then
NOT SEND anymore on this particular address set.
Summarize will send one alarm per-ThrottleInterval, per-
address set. The first alarm is sent normally.
Subsequent alarm are counted until the end of the
ThrottleInterval, when a SUMMARY ALARM is sent.
GlobalSummarize will send only one alarm per-
ThrottleInterval, for all address sets currently being
monitored. This limits alarms in a ThrottleInterval to 1
per-signature across the whole sensor so you can reduce
the alarm bandwidth of flood attacks.
STRING.HTTP - ChokeThreshold
(NUMBER)
Threshold value of alarms-per-interval to auto-switch
AlarmThrottle modes. If ChokeThreshold is defined and NOT
set to ANY, the sensor will automatically switch
AlarmThrottle modes. The switch is based on per-sensor
counts of each signature frequency in the
ThrottleInterval. If the per-interval frequency of
alarms of a signature is greater than ChokeThreshold, the
mode is switched to Summarize. If the per-interval
frequency is greater than TWICE the ChokeThreshold, the
mode is switched to GlobalSummarize. See the ENGINE
PARAMETERS SUPPLEMENT for more details.
STRING.HTTP - DeObfuscate
(BOOL: TRUE FALSE)
Apply anti-evasive deobfuscation before searching for the
RegexString
STRING.HTTP - Direction
(BOOL: FromService ToService) PROTECTED
One of 'ToService' or 'FromService' indicating whether we
are watching traffic destined to or coming from the
service port
STRING.HTTP - FlipAddr
(BOOL: TRUE FALSE)
TRUE if address (and ports) Source and Destination are
swapped in the alarm message. FALSE or ANY for no swap.
STRING.HTTP - InspectionGroup
(NUMBER: 0–10000) HIDDEN
Special inspection short-circuit group (expert use only).
STRING.HTTP - MaxInspectLength
(NUMBER)
Maximum number of bytes to inspect
STRING.HTTP - MinHits
(NUMBER: 0–1000)
Minimum number of signature hits before the alarm message
is sent. This a throttle for firing the alarm only after
X times of seeing the signature on the address key.
STRING.HTTP - MinMatchLength
(NUMBER)
Minimum number of bytes the RegexString must match.
STRING.HTTP - MultipleHits
(BOOL: TRUE FALSE)
Search for multiple RegexStrings in one packet.
STRING.HTTP - PreFilterDepth
(NUMBER) HIDDEN
How far will we look into the stream before deciding that
this is not a valid Web stream. Works with the
PreFilterList -- If we do not see one of the strings
specified in the 'PreFilterList' we will quit looking for
Web requests to the server on this stream.

TABLE 6-continued

Example Parameters

STRING.HTTP - PreFilterList
(STRING) HIDDEN
List of strings to match before beginning Regex string
searching. One of these strings must be found in the
first 'PreFilterDepth' bytes of the stream (to service)
in order for this stream to be recognized as a valid Web
stream.
STRING.HTTP - Protocol
(BITSET: RPORTMAP IP TCP UDP ICMP RSWEEP TPORTSWEEP
RPC) HIDDEN REQUIRED
Protocol of interest for this inspector (expert use
only).
STRING.HTTP - RegexString
(STRING) PROTECTED HIDDEN REQUIRED
Regular Expression for which to search.
STRING.HTTP - ResetAfterIdle
(NUMBER: 15–1000)
Number of seconds to wait to reset signature counters
after the host(s) were idle.
STRING.HTTP - ServicePorts
(SET)
A comma separated list of ports or port ranges where the
target service may reside
STRING.HTTP - SigComment
(STRING)
USER NOTES - miscellaneous information about this
signature.
STRING.HTTP - SIGID
(NUMBER: 1000–50000) PROTECTED REQUIRED
Signature Identifier. 1000–19999 valid for default
signatures. 20000–50000 valid for user signatures.
STRING.HTTP - SigName
(STRING) PROTECTED
Official name of the signature.
STRING.HTTP - SigStringInfo
(STRING)
Extra information included in the alarm message.
STRING.HTTP - StorageKey
(ENUM: GLOBALSRC DST DUAL QUAD STREAM CUSTOM)
HIDDEN REQUIRED
Type of Address Key used to store persistent data (expert
use only).
STRING.HTTP - StripTelnetOptions
(BOOL: TRUE FALSE)
Strip telnet option characters from data before
searching.
STRING.HTTP - SubSig
(NUMBER)
Sub-Signature ID. Denotes a specific variant of a
signature.
STRING.HTTP - ThrottleInterval
(NUMBER: 0–1000)
Number of seconds defining an Alarm Throttle interval.
This is used with the AlarmThrottle parameter to tune
special alarm limiters.
STRING.HTTP - WantFrag
(BOOL: TRUE FALSE) PROTECTED
TRUE if a fragment is desired. FALSE if a fragment is
not desired. ANY for either.
Sweep Engine Parameters
SWEEP.PORT.TCP - AlarmInterval
(NUMBER: 20–3600)
Duration to aggregate alarms. After AlarmInterval
seconds following the first alarm on a dataset, the
counters are reset to zero. The Alarm will fire when you
get (Alarm Hits >= MinHits) in AlarmInterval seconds.
SWEEP.PORT.TCP - AlarmThrottle
(ENUM: FireAll FireOnce Summarize GlobalSummarize)
Technique used to limit alarm firings. FireAll will
always send alarms when the signature alarm condition is
met. FireOnce will send only the first alarm, and then
NOT SEND anymore on this particular address set.
Summarize will send one alarm per-ThrottleInterval, per-
address set. The first alarm is sent normally.
Subsequent alarm are counted until the end of the
ThrottleInterval, when a SUMMARY ALARM is sent.
GlobalSummarize will send only one alarm per- TABLE 6-continued Example Parameters ThrottleInterval, for all address sets currently being
monitored. This limits alarms in a ThrottleInterval to 1
per-signature across the whole sensor so you can reduce
the alarm bandwidth of flood attacks.
SWEEP.PORT.TCP - ChokeThreshold
(NUMBER)
Threshold value of alarms-per-interval to auto-switch
AlarmThrottle modes. If ChokeThreshold is defined and NOT
set to ANY, the sensor will automatically switch
AlarmThrottle modes. The switch is based on per-sensor
counts of each signature frequency in the
ThrottleInterval. If the per-interval frequency of
alarms of a signature is greater than ChokeThreshold, the
mode is switched to Summarize. If the per-interval
frequency is greater than TWICE the ChokeThreshold, the
mode is switched to GlobalSummarize. See the ENGINE
PARAMETERS SUPPLEMENT for more details.
SWEEP.PORT.TCP - FlipAddr
(BOOL: TRUE FALSE)
TRUE if address (and ports) Source and Destination are
swapped in the alarm message. FALSE or ANY for no swap.
SWEEP.PORT.TCP - InspectionGroup
(NUMBER: 0–10000) HIDDEN
Special inspection short-circuit group (expert use only).
SWEEP.PORT.TCP - InvertedSweep
(BOOL: TRUE FALSE)
Use SRCPORT instead of DSTPORT for Unique counting
SWEEP.PORT.TCP - Mask
(BITSET: FIN SYN RST PSH ACK URG) PROTECTED REQUIRED
Mask used in TcpFlags comparison.
SWEEP.PORT.TCP - MaxInspectLength
(NUMBER)
Maximum number of bytes to inspect
SWEEP.PORT.TCP - MinHits
(NUMBER: 0–1000)
Minimum number of signature hits before the alarm message
is sent. This a throttle for firing the alarm only after
X times of seeing the signature on the address key.
SWEEP.PORT.TCP - PortRange
(NUMBER) REQUIRED
Only Low Ports (1), Only High Ports (2), or All (0)
SWEEP.PORT.TCP - Protocol
(BITSET: RPORTMAP IP TCP UDP ICMP RSWEEP TPORTSWEEP
RPC) HIDDEN REQUIRED
Protocol of interest for this inspector (expert use
only).
SWEEP.PORT.TCP - ResetAfterIdle
(NUMBER: 15–1000)
Number of seconds to wait to reset signature counters
after the host(s) were idle.
SWEEP.PORT.TCP - SigComment
(STRING)
USER NOTES - miscellaneous information about this
signature.
SWEEP.PORT.TCP - SIGID
(NUMBER: 1000–50000) PROTECTED REQUIRED
Signature Identifier. 1000–19999 valid for default
signatures. 20000–50000 valid for user signatures.
SWEEP.PORT.TCP - SigName
(STRING) PROTECTED
Official name of the signature.
SWEEP.PORT.TCP - SigStringInfo
(STRING)
Extra information included in the alarm message.
SWEEP.PORT.TCP - StorageKey
(ENUM: GLOBALSRC DST DUAL QUAD STREAM CUSTOM)
HIDDEN REQUIRED
Type of Address Key used to store persistent data (expert
use only).
SWEEP.PORT.TCP - SubSig
(NUMBER)
Sub-Signature ID. Denotes a specific variant of a
signature.
SWEEP.PORT.TCP - SupressReverse
(BOOL: TRUE FALSE)
Do not fire when a sweep has fired in the reverse
direction TABLE 6-continued Example Parameters SWEEP.PORT.TCP - TcpFlags
(BITSET: FIN SYN RST PSH ACK URG) PROTECTED REQUIRED
TCP Flags to match when masked by Mask.
SWEEP.PORT.TCP - ThrottleInterval
(NUMBER: 0–1000)
Number of seconds defining an Alarm Throttle interval.
This is used with the AlarmThrottle parameter to tune
special alarm limiters.
SWEEP.PORT.TCP - Unique
(NUMBER: 2–40) REQUIRED
Maximum number of unique port connections between the two
hosts.
SWEEP.PORT.TCP - WantFrag
(BOOL: TRUE FALSE) PROTECTED
TRUE if a fragment is desired. FALSE if a fragment is
not desired. ANY for either.

Although the present invention has been described with several example embodiments, various changes and modifications may be suggested to one skilled in the art. It is intended that the present invention encompass those changes and modifications as they fall within the scope of the claims.

What is claimed is:

1. A method for detecting network intrusion comprising:
receiving configuration data associated with a defined signature;
providing an inspector shell;
generating, based on the received configuration data, a plurality of parameter-value associations for use in defining the defined signature;
automatically generating, by a computer, an inspector instance from the inspector shell and the generated parameter-value association, the inspector instance operable to:
receive traffic traveling on the network;
compare the traffic to data indicative the defined signature;
detect network intrusion in response to the comparison; and
executing the inspector instance.

2. The method of claim 1, wherein receiving configuration data associated with a signature comprises receiving configuration data from a user.

3. The method of claim 1, wherein receiving configuration data associated with a signature comprises receiving configuration data stored in one or more data files.

4. The method of claim 1, wherein the inspector instance is further operable to extract parameter names and associated values from the received traffic.

5. The method of claim 1, wherein the inspector instance is further operable to determine if a parameter within the received traffic is relevant to the defined signature and, if not, discard the associated value rather than test the associated value against the signature.

6. A system for detecting network intrusion comprising:
a packet capturer operable to acquire network traffic;
a database operable to store data indicative of the network traffic acquired by the packet capturer;
a plurality of engine groups, each engine group comprising a plurality of engines, each engine comprising:
a parser operable to receive configuration data for use in defining a signature to be detected and create a structured version therefrom;

an inspector shell comprising coding operable to compare a defined signature to the acquired network traffic; and an inspector generator operable to generate an inspector instance from the structured version of the configuration data and the inspector shell, the inspector instance operable to compare the defined signature to the acquired network traffic; and an output handler operable to generate an indication of a detected intrusion in response to a signal from the inspector instance.

7. The system of claim 6, wherein the output handler is further operable to generate an indication of a detected intrusion.

8. The system of claim 6, and further comprising a configuration handler operable to receive the configuration data from a user and provide the data to the parser.

9. The system of claim 6, and further comprising a configuration file associated with the configuration handler.

10. The system of claim 6, and further comprising the inspector instance.

11. The system of claim 6, wherein the parser further comprises:

a tokenizer operable to receive the configuration data and associate parameters names with parameter values within the configuration data and create a plurality of parameters name-value pairs; and an internalizer operable to verify the parameter name-value pairs are within acceptable ranges and create an optimized data structure for the parameter name-value pairs.

12. The system of claim 10, wherein the inspector instance comprises:

a protocol decoder operable to decode a packet of network traffic; and a comparator and evaluator operable to receive the decoded packet of network traffic and determine whether the packet matches the defined signature.

13. The system of claim 12, wherein the comparator and evaluator is further operable to:

examine the decoded packet;

determine which parameters in the decoded packet to test against the defined signature; and determine if all of the tested parameters are met.

14. The system of claim 13, wherein the comparator and evaluator is further operable to halt operation upon determining that any one of the tested parameters is not met.

15. The system of claim 6, wherein the database associates traffic data by Internet Protocol source and destination address.

16. The system of claim 6, wherein the database associates traffic data by attributes of the acquired network traffic.

17. The system of claim 6, wherein the plurality of engine groups comprise:

an atomic engine group;

a flood engine group;

a sweep engine group;

a string engine group; and a service engine group.

18. The system of claim 6, wherein the inspector generator is formed integral with the parser.

19. The system of claim 6, wherein the packet capturer, parser, inspector shell, inspector generator, and output handler comprise computer code in the C++ programming language.

* * * * *